US012716801B2

(12) United States Patent
Wang

(10) Patent No.: US 12,716,801 B2
(45) Date of Patent: Aug. 25, 2026

(54) SPRING SYSTEM FOR LEAK TEST STATION

(71) Applicant: FCA US LLC, Auburn Hills, MI (US)

(72) Inventor: Hongyu Wang, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 318 days.

(21) Appl. No.: 18/415,186

(22) Filed: Jan. 17, 2024

(65) Prior Publication Data

US 2025/0231075 A1 Jul. 17, 2025

(51) Int. Cl.
*G01M 3/02* (2006.01)

(52) U.S. Cl.
CPC .................................. *G01M 3/025* (2013.01)

(58) Field of Classification Search
CPC ........... G01M 3/00; G01M 3/02; G01M 3/025
See application file for complete search history.

(56) References Cited

U.S. PATENT DOCUMENTS 9,541,466 B2 * 1/2017 Kawasaki ............. G01M 3/022
2007/0256478 A1 11/2007 Guadagnola et al.

FOREIGN PATENT DOCUMENTS

CN 201028986 Y 2/2008
CN 201497618 U 6/2010
CN 207996825 U 10/2018
DE 202017101933 U1 * 5/2018 .......... G01M 13/005
JP 2010243290 A * 10/2010 .............. G01M 3/26
JP 2019095303 A * 6/2019 .............. G01M 3/26

OTHER PUBLICATIONS

Machine Translation of DE-202017101933-U1 (Year: 2018).*
Machine Translation of JP-2019095303 A (Year: 2019).*
Machine Translation of JP 2010243290 A (Year: 2010).*

* cited by examiner

*Primary Examiner* — Nguyen Q. Ha
(74) *Attorney, Agent, or Firm* — Jeremy J. Klobucar

(57) ABSTRACT

A leak test fixture for a part such as a cylinder head or block has a plurality of side face sealing plates, a bottom face sealing plate and a top face sealing plate. The sealing plates collectively clamp and seal the part during testing of the part. A plurality of biasing mechanisms are provided on at least one of the sealing plates. The plurality of biasing mechanisms compress toward a face of the at least one sealing plate during clamping of the part. The plurality of biasing mechanisms rebound after testing of the part thereby help separating the part from the at least one sealing plate.

2 Claims, 3 Drawing Sheets

12
16
22
24
32
18
14
10
30

12
42
42
3
3

40
42

48
46
42
44
12

50
12
32

14
30

SPRING SYSTEM FOR LEAK TEST STATION

FIELD

The present disclosure relates to part testing and, more particularly, to a vehicle part testing system for leak detection.

BACKGROUND

This section provides background information related to the present disclosure which is not necessarily prior art.

Various types of systems and apparatus are utilized to test for leakage of vehicle parts such as cylinder heads, cylinder block or battery tray housings. These devices utilize various sealing plates to seal a part so that it can be tested for leaks. Generally, such a part has an overall box configuration and requires a leak test fixture having sealing plates for the top, bottom and four sides of the part. After testing, when the part is released from the fixture, a separation force must be created to overcome a negative pressure between the sealing plates the part having cavities, so as to separate or remove the sealing plates from the part. Thus, when the part is to be removed, due to the negative pressure between the sealing plates and the cavities of the part, it is not a smooth process. This invisible and uncertain negative pressure may lead to scratching the part or even the part being dropped from the fixture and damaged when the part is released from the fixture.

Thus, there is a need to remove the invisible and uncertain force from the part prior to the removal of the part from the fixture or jig.

The present disclosure provides a test fixture or jig with a system for alleviating the negative pressure between sealing plates of the test fixture and a part to be tested such as a cylinder head or block so that damage to the part does not occur before and after testing of the part. The present disclosure provides a system that helps separate the sealing plates from the part without causing damage to the part. The present disclosure provides a biasing mechanism that compresses toward a face of the sealing plates during testing of the part and extends away from the face of the sealing plates after testing of the part so as to enable smooth separation of the sealing plates from the part.

SUMMARY

This section provides a general summary of the disclosure, and is not a comprehensive disclosure of its full scope or all of its features.

According to an aspect of the disclosure, a leak test fixture for a part such as a cylinder head or block comprises a plurality of side face sealing plates, a bottom face sealing plate and top face sealing plate where the sealing plates collectively seal the part for testing of the part. A plurality of biasing mechanisms are positioned on the sealing plates. The plurality of biasing mechanisms compress toward a face of the sealing plates during clamping of the part during testing of the part. The plurality of biasing mechanisms rebound after testing of the part thereby help separating the part from the sealing plates, or vice versa. The biasing mechanisms generally are compression springs. The sealing plates include a plurality of bores to receive the plurality of biasing mechanisms/members or compression springs. Each of the plurality of biasing mechanisms/members or compression springs includes a pad for resting against the part to prevent marring the part. The pad is generally a soft material such as rubber, felt or the like.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figures 1, 2:
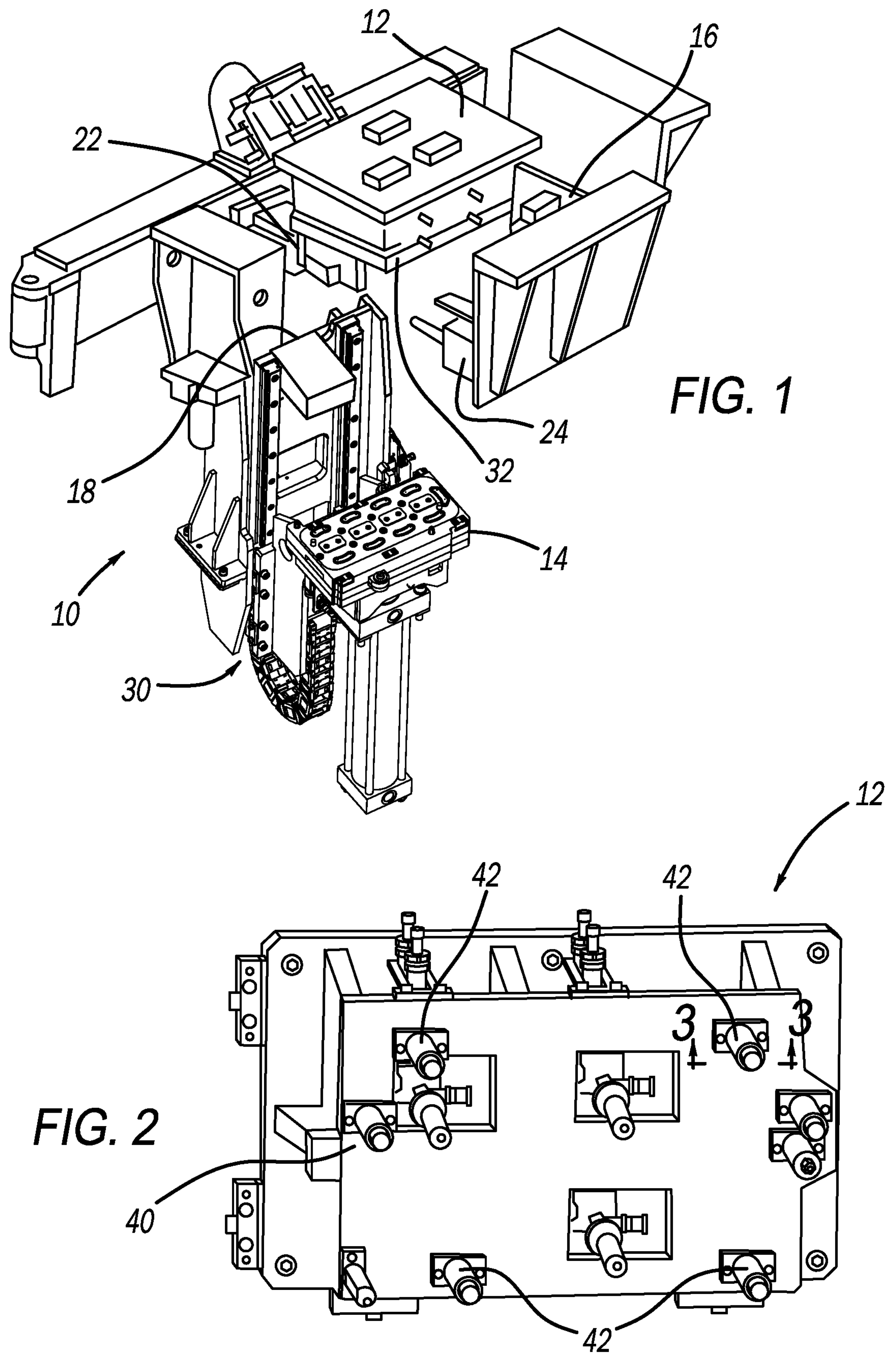
FIG. 1 illustrates a perspective schematic view of a test fixture.
FIG. 2 illustrates a schematic perspective view of a sealing plate.

Example embodiments will now be described more fully with reference to the accompanying drawings.

Turning to the figures, a leak test fixture is illustrated and designated with the reference numeral 10. The leak test fixture 10 includes a top sealing plate 12, a bottom sealing plate 14, a front sealing plate 16, a rear sealing plate 18, an exhaust face sealing plate 22 and an intake sealing face plate 24 for covering the sides of a part 32 such as a cylinder head, cylinder block, transmission housing, motor housing or battery tray housing. The leak test fixture 10 includes a hydraulic system 30 for bringing the sealing plates against the part 32.

The hydraulic system 30, once the part 32 is in place, is activated so that the sealing plates 14-22 contact the part 32 in a sealing position. The sealing plates 14-22 may include a spring biasing system 40 as will be explained herein.

Figures 3, 4:
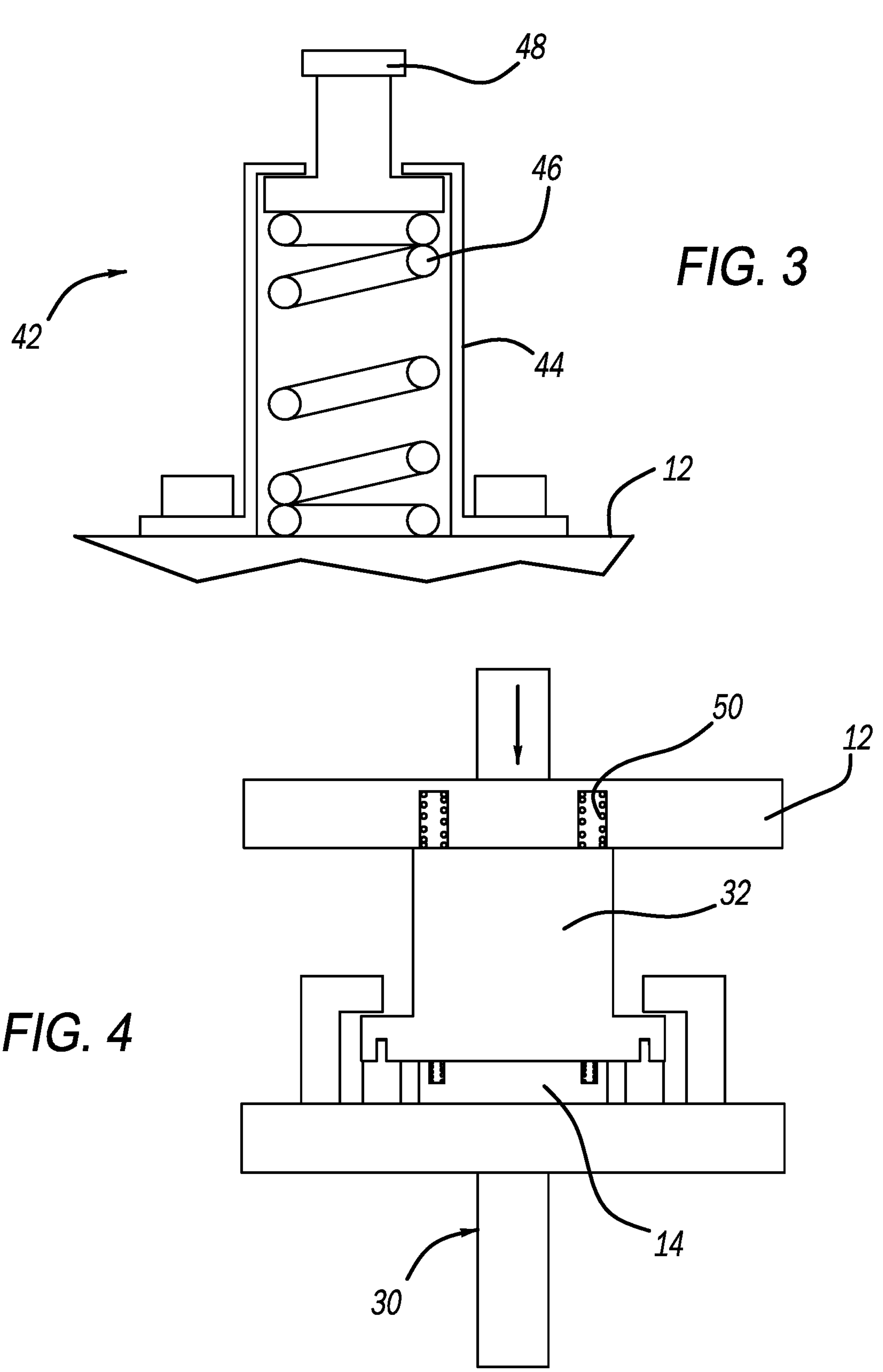
FIG. 3 illustrates a schematic view of a biasing mechanism/member.
FIGS. 4 and 5 illustrate schematic views of the biasing mechanism/member when the test fixture is in a clamping position and in an unclamping position, respectively.
Figure 5:
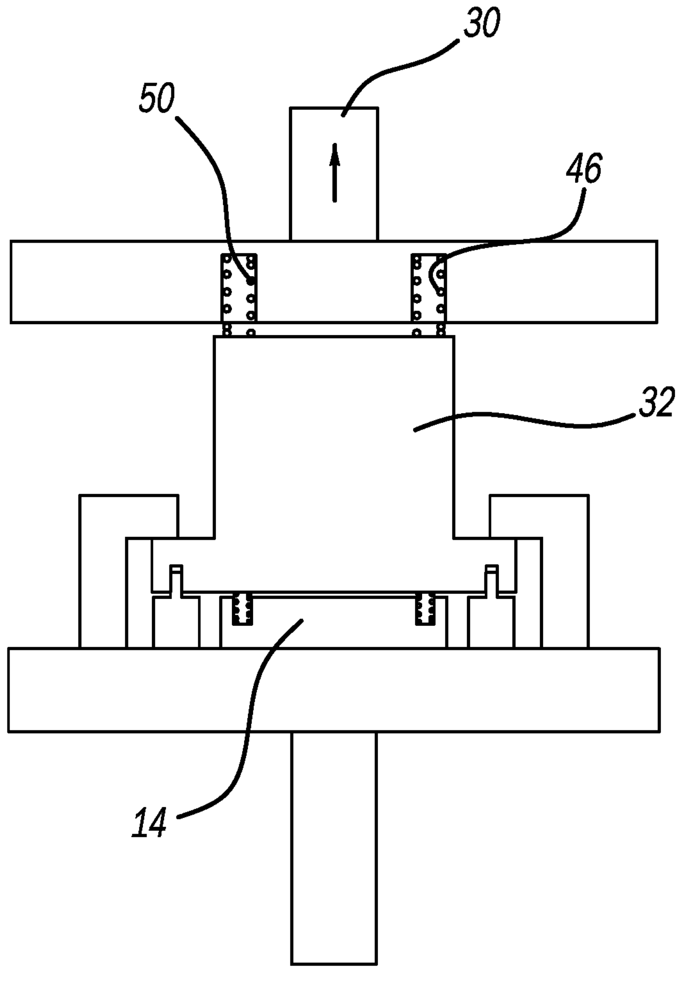

As illustrated in FIGS. 2-4, on the top sealing plate 12, the spring biasing system 40 is positioned on the plate 12. The biasing system 40 includes a plurality of individual biasing members 42. The biasing members 42 may include a housing 44, a compression spring 46 positioned within the housing 44. A pad 48, manufactured from a soft material, such as rubber, felt, plastic or the like, is positioned and connected at the end of the spring 46. The plate 12 may include a bore 50 to receive the spring as illustrated in FIG. 4.

The compression spring 46 extends from the plate in an unclamped position. The pad 48 rests against the part 32 to prohibit damage or marring of the part. As the hydraulic system 30 is activated, the sealing plates 14-22 press against the part 32, cylinder block 32. As this occurs, the springs 46 are compressed into the plates as illustrated in FIG. 4. The part is tested for linkage and after the test, the hydraulic force is removed. As this occurs, the compression springs 46 rebound or expand moving the plate away from the part 32 to remove the uncertain negative pressure holding the sealing plate 12 against the part 32. Thus, the springs 46 with pads 48 may be positioned on all of the sealing plates 14-24 so that upon removal of the uncertain negative pressure, the part 32 is positioned away from the sealing plates 12 so that it can be easily removed from the test fixture. The part 32 is contacted by the soft material pad 48 so that damage to the part 32 does not occur. Also, the springs 46 have a desired spring force to push the plates 12 away from the part 32 so that the part 32 does not stick to the plate 12, or vice versa. Thus, this removes the possibility of the part 32 sticking to the sealing plates and/or damage occurring to the part 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A leak test fixture for leak testing a part such as a cylinder head or block comprising:

a plurality of side face sealing plates, a bottom face sealing plate and a top face sealing plate, the sealing plates collectively sealing the part placed on the fixture for testing; and a plurality of biasing mechanisms provided on at least one sealing plate of the sealing plates, wherein each biasing mechanism includes a housing that projects outward from a face of the least one sealing plate, the housings each define a bore that houses a compression spring attached to the face of the at least one plate, and a pad that is configured to rest against the part is attached to the compression spring; and the compression springs are configured to compress toward the face of the at least one sealing plate when the at least one sealing plate seals the part during testing, and the compression springs are configured to rebound away from the face of the at least one sealing plate when the at least one sealing plate is separated from the part after testing.

2. The leak test fixture of claim 1, wherein the pad is formed of a soft material such as rubber or plastic.

* * * * *